United States Patent
Tseng (10) Patent No.: US 11,260,933 B2
(45) Date of Patent: Mar. 1, 2022

(54) SHOCK-ABSORBING FRONT FORK ASSEMBLY OF MOTORCYCLE

(71) Applicant: Chih-Hung Tseng, Taichung (TW)

(72) Inventor: Chih-Hung Tseng, Taichung (TW)

(*) Notice: Subject to any disclaimer, the term of this patent is extended or adjusted under 35 U.S.C. 154(b) by 280 days.

(21) Appl. No.: 16/664,551

(22) Filed: Oct. 25, 2019

(65) Prior Publication Data

US 2020/0140032 A1 May 7, 2020

(30) Foreign Application Priority Data

Nov. 5, 2018 (TW) ................. 107215028

(51) Int. Cl.
| | |
|---|---|
| *B62K 25/08* | (2006.01) |
| *B62J 99/00* | (2020.01) |
| *B62J 45/00* | (2020.01) |
| *B62L 3/00* | (2006.01) |

(52) U.S. Cl.
CPC ............. *B62K 25/08* (2013.01); *B62J 99/00* (2013.01); *B62L 3/00* (2013.01); *B62J 45/00* (2020.02)

(58) Field of Classification Search
CPC .. B62K 25/08; B62K 2025/044; B62K 21/02; B62J 99/00; B62L 3/00; B62L 3/023
See application file for complete search history.

(56) References Cited

U.S. PATENT DOCUMENTS

| | | | | |
|---|---|---|---|---|
| 3,899,049 | A * | 8/1975 | Martin .................. | F16D 55/228 188/18 A |
| 3,989,261 | A * | 11/1976 | Kawaguchi ............ | B62K 19/38 280/276 |
| 4,367,882 | A * | 1/1983 | Alexander ............. | B62K 25/08 188/272 |
| 4,392,664 | A * | 7/1983 | Tsuchiya ................ | B62K 21/02 280/276 |
| 4,437,678 | A * | 3/1984 | Schultz .................. | B62K 25/08 280/276 |
| 4,515,384 | A * | 5/1985 | Honma .................. | B62K 25/08 188/272 |
| 4,524,844 | A * | 6/1985 | Williams, Jr. ......... | B62K 25/08 180/219 |
| 4,552,373 | A * | 11/1985 | Kawaguchi ............ | B62K 25/08 180/219 |

(Continued)

*Primary Examiner* — Tony H Winner
*Assistant Examiner* — Michael R Stabley
(74) *Attorney, Agent, or Firm* — Birch, Stewart, Kolasch & Birch, LLP (57) ABSTRACT

A shock-absorbing front fork assembly of a motorcycle includes a front fork, a pressure buffering cylinder and a control valve disposed between the front fork and the pressure buffering cylinder and electrically connected with a brake system to control the communication between the front fork and the pressure buffering cylinder according to the operation of the brake system. When the brake system is not actuated, the control valve is open to make the front fork communicate with the pressure buffering cylinder, thereby making the spring supporting force relatively smaller. When the brake system is actuated, the control valve is close to make the front fork not communicate with the pressure buffering cylinder, thereby making the spring supporting force relatively larger. Therefore, the spring supporting force is adjusted by the brake operation, that raises the riding comfort and safety.

6 Claims, 7 Drawing Sheets

(56) References Cited

U.S. PATENT DOCUMENTS

| | | | | |
|---|---|---|---|---|
| 4,697,825 A | * | 10/1987 | Hayashi | ................ B60T 8/1706 188/181 A |
| 4,721,322 A | * | 1/1988 | Hawkins | ............ B60G 17/0272 188/272 |
| 6,336,648 B1 | * | 1/2002 | Bohn | ..................... B62K 25/04 280/276 |

* cited by examiner

SHOCK-ABSORBING FRONT FORK ASSEMBLY OF MOTORCYCLE buffering cylinder, and a control valve disposed between the front fork and the pressure buffering cylinder. The control valve is further electrically connected with a brake system in a way that the control valve is switched between an open state and a close state according to the operation of the brake system. When the brake system is not actuated to brake, the control valve is in the open state to make the front fork and the pressure buffering cylinder communicate with each other. At this time, the spring supporting force is relatively smaller. When the brake system is actuated to brake, the control valve is in the close state to make the front fork and the pressure buffering cylinder not communicate with each other. At this time, the spring supporting force is relatively larger. As a result, in the present invention the spring supporting force of the shock-absorbing front fork assembly is adjusted by the operation of the brake, so that the riding comfort is increased and the running safety is raised.

Preferably, the control valve may be attached to the front fork or the pressure buffering cylinder in accordance with a structure of oil-air separation type or oil-air hybrid type. Specifically speaking, for the oil-air separation type structure, the front fork has a first air chamber, a first oil chamber not communicating with the first air chamber, and a second oil chamber communicating with the first oil chamber; the pressure buffering cylinder has a second air chamber; the control valve is attached to the front fork and connected with the pressure buffering cylinder through a pipe. When the control valve is in the open state, the first and second air chambers communicate with each other. When the control valve is in the close state, the first and second air chambers are blocked from communicating with each other. For the oil-air hybrid type structure, the front fork has a first air chamber, a first oil chamber communicating with the first air chamber, and a second oil chamber communicating with the first oil chamber; the pressure buffering cylinder has a second air chamber and a third oil chamber not communicating with the second air chamber; the control valve is attached to the pressure buffering cylinder and connected with the front fork through a pipe. When the control valve is in the open state, the second and third oil chambers communicate with each other. When the control valve is in the close state, the second and third oil chambers are blocked from communicating with each other.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

First of all, it is to be mentioned that throughout this specification, including the following embodiments and claims, the directional terms such as 'above', 'below', 'top', 'bottom', 'in', and 'out' are all based on the direction shown in the figures. Besides, same reference numerals used in the following embodiments and the appendix drawings designate same or similar elements or the structural features thereof.

Figure 1:
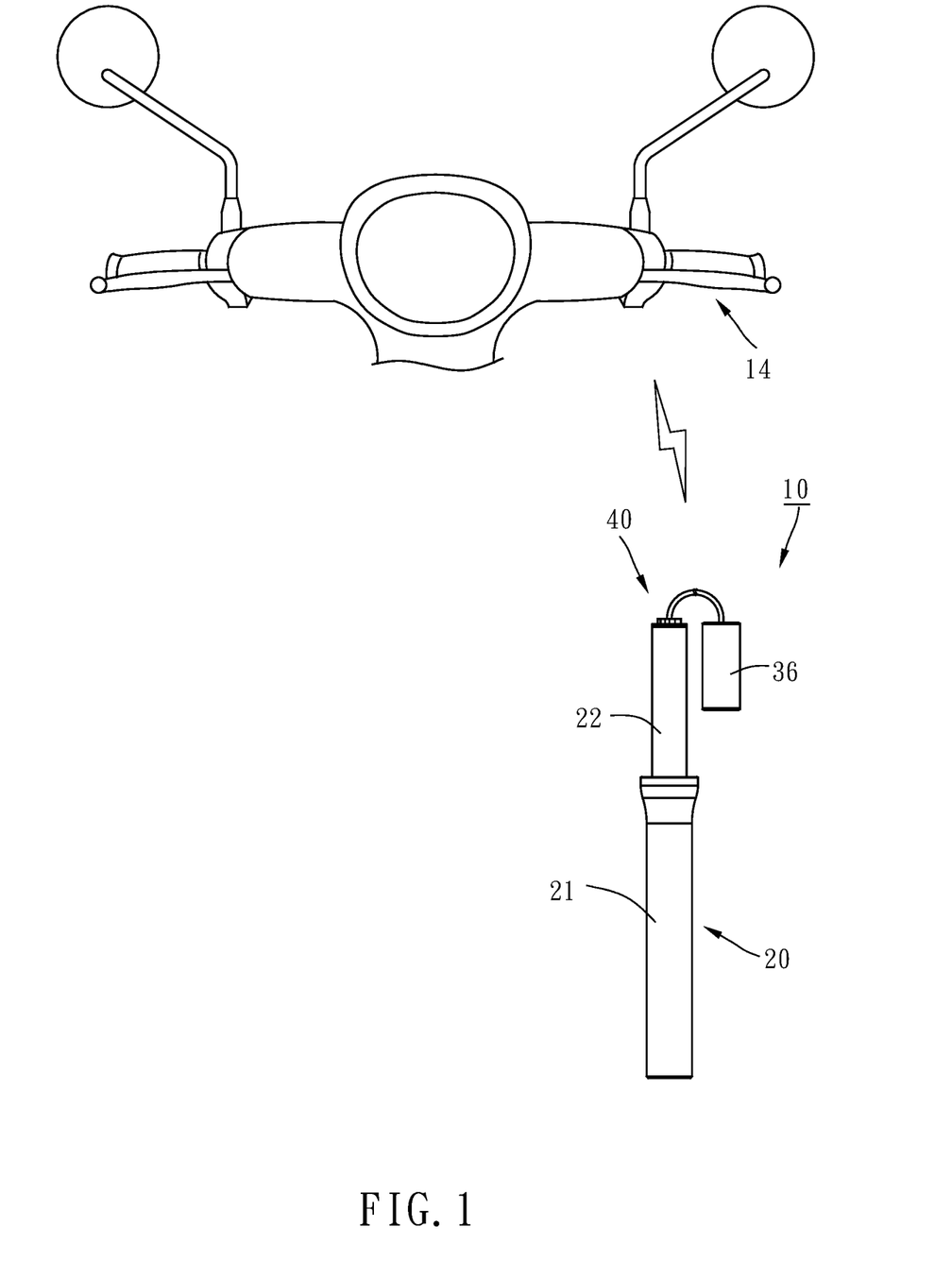
FIG. 1 is a schematic drawing of a shock-absorbing front fork assembly of a first embodiment of the present invention.
Figure 2:
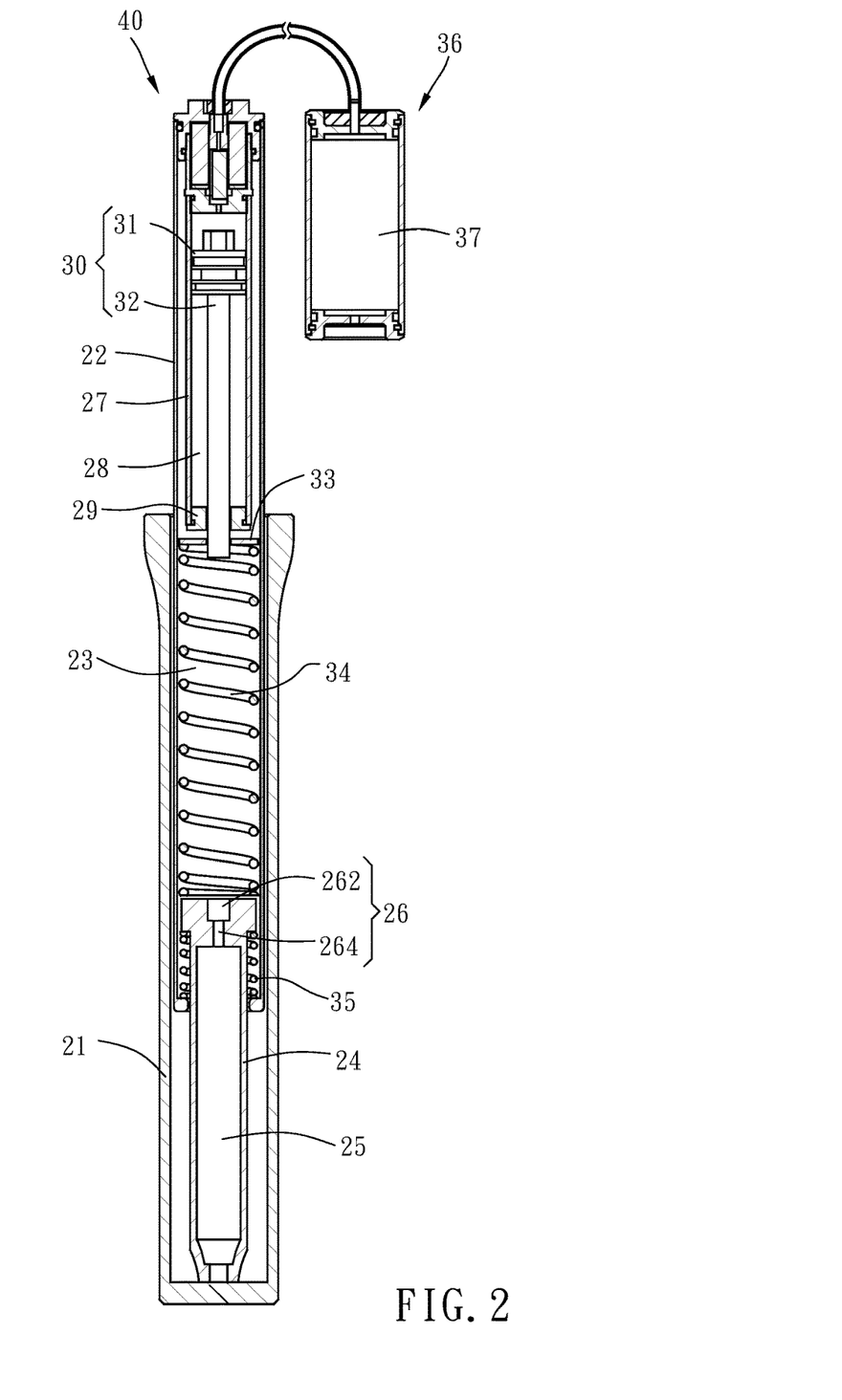
FIG. 2 is a sectional view of the shock-absorbing front fork assembly of the first embodiment of the present invention.

Referring to FIGS. 1 and 2, a shock-absorbing front fork assembly 10 of a first embodiment of the present invention has an oil-air separation type structure, which includes a front fork 20, a pressure buffering cylinder 36, and a control valve 40.

The front fork 20 in this embodiment has an outer tube 21, an inner tube 22, an oil storage cylinder 24, an air storage cylinder 27, a piston rod 30, a pressing plate 33, a first spring 34, and a first damping spring 35.

The inner tube 22 is inserted into the outer tube 21 through the top end of the outer tube 21 and vertically displaceable relative to the outer tube 21. The inner tube 22 is provided therein with a first oil chamber 23 for the storage of damping oil.

The top end of the oil storage cylinder 24 is inserted into the inner tube 22 through the bottom end of the inner tube 22 in a way that the inner tube 22 will not interfere with the oil storage cylinder 24 during vertically displacing relative to the outer tube 21. The bottom end of the oil storage cylinder 24 is fixed to the bottom end of the outer tube 21. Besides, the oil storage cylinder 24 is provided therein with a second oil chamber 25 for the storage of damping oil, and the top end of the oil storage cylinder 24 has a throttling hole 26. The throttling hole 26 has a large hole portion 262 communicating with the first oil chamber 23 and a small hole portion 264 communicating with the second oil chamber 25, the primary function of which is restricting the velocity and quantity of the damping oil flowing between the first and second oil chambers 23 and 25.

The air storage cylinder 27 is disposed in the inner tube 22 and provided with a first air chamber 28 for the storage of high-pressure air. The air storage cylinder 27 has an open top end and a close bottom end provided with an end cap 29.

The piston rod 30 has a rod head 31 and a rod body 32. The outer peripheral edge of the rod head 31 is tightly abutted against the inner peripheral surface of the air storage cylinder 27. The top end of the rod body 32 is connected with the rod head 31. The bottom end of the rod body 32 penetrates through the end cap 29 to be located out of the bottom end of the air storage cylinder 27 and connected with the pressing plate 33, so that the piston rod 30 and the pressing plate 33 can move simultaneously.

The first spring 34 is disposed in the first oil chamber 23 and abutted between the pressing plate 33 and the top end of the oil storage cylinder 24, for providing buffering effect to the inner tube 22 pressing downwardly.

The first damping spring 35 is disposed in the first oil chamber 23 and abutted between the bottom end of the inner tube 22 and the top end of the oil storage cylinder 24, for providing buffering effect to the inner tube 22 returning upwardly.

The pressure buffering cylinder 36 in this embodiment only has a second air chamber 37 for the storage of high-pressure air.

Figure 3:
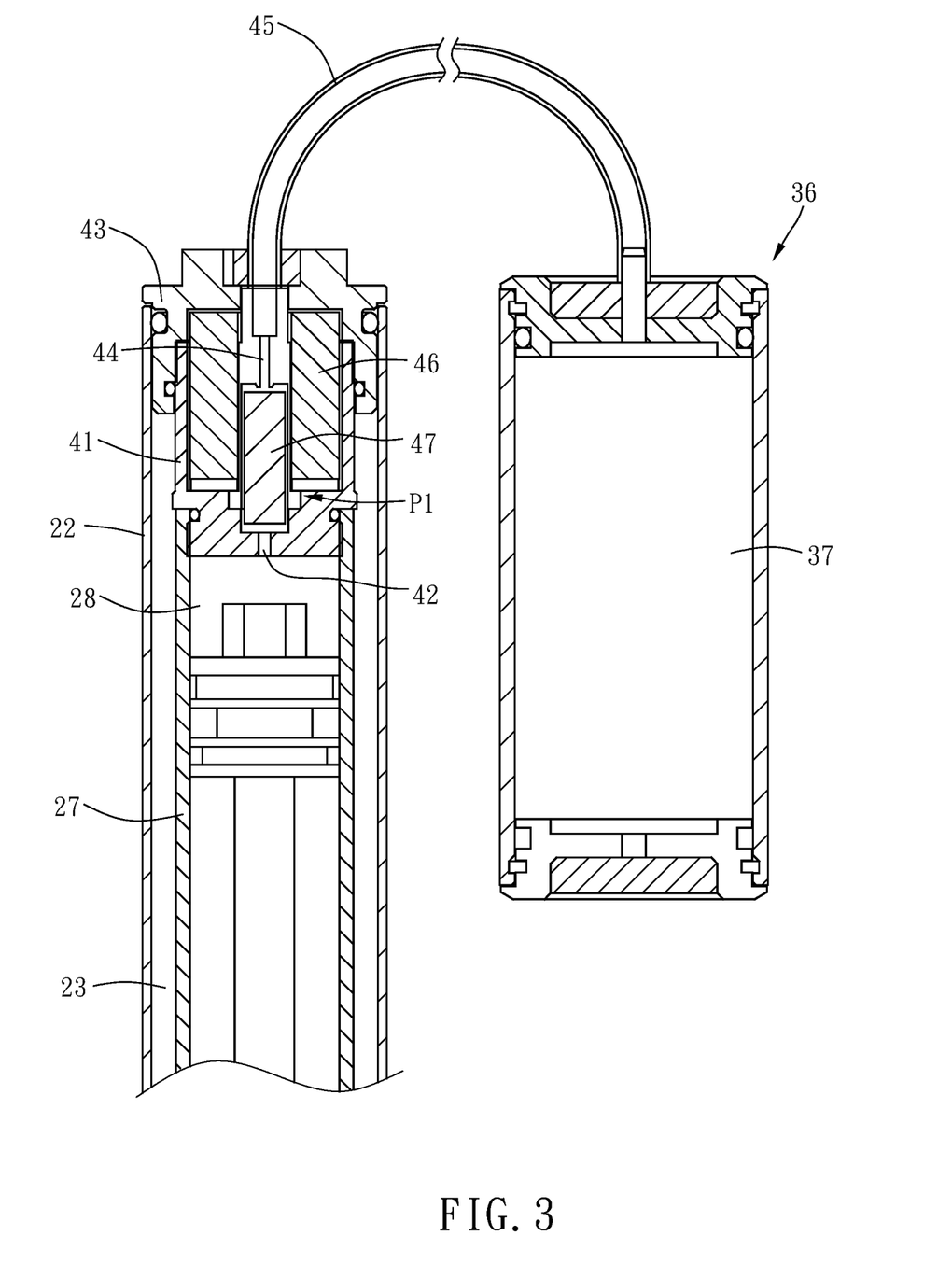
FIG. 3 is an enlarged view of a part of FIG. 2, primarily showing that a control valve is in an open state.

The control valve 40 in this embodiment is attached to the front fork 20. Specifically speaking, the control valve 40 has a valve seat 41, a valve cap 43, a coil 46, and a valve core 47. The valve seat 41 is installed at the top end of the air storage cylinder 27 to close the first air chamber 28, and the valve seat 41 has a first valve hole 42 communicating with the first air chamber 28. The valve cap 43 is fixed to the top end of the inner tube 22 to close the first oil chamber 23, and combined with the valve seat 41 to allow the coil 46 to be accommodated therebetween. Besides, the valve cap 43 has a second valve hole 44, and the valve cap 43 is connected with the pressure buffering cylinder 36 through a pipe 45 in a way that the second valve hole 44 of the valve cap 43 communicates with the second air chamber 37 of the pressure buffering cylinder 36. The coil 46 is disposed between the valve seat 41 and the valve cap 43 and electrically connected with a brake system 14 in a way that the coil 46 can be disconnected from power or connected to power according to the operation of the brake system 14. The valve core 47 is disposed between the first and second valve holes 42 and 44 and surrounded by the coil 46. When the brake system 14 is not actuated to brake, the coil 46 is disconnected from power, and the valve core 47 is freely movable between the first and second valve holes 42 and 44, so that the first and second air chambers 28 and 37 communicate with each other. When the brake system 14 is actuated to brake, the coil 46 is connected to power, and the valve core 47 is attracted by the coil 46 to block up the second valve hole 44, so that the first and second air chambers 28 and 37 are blocked from communicating with each other.

Figure 4:
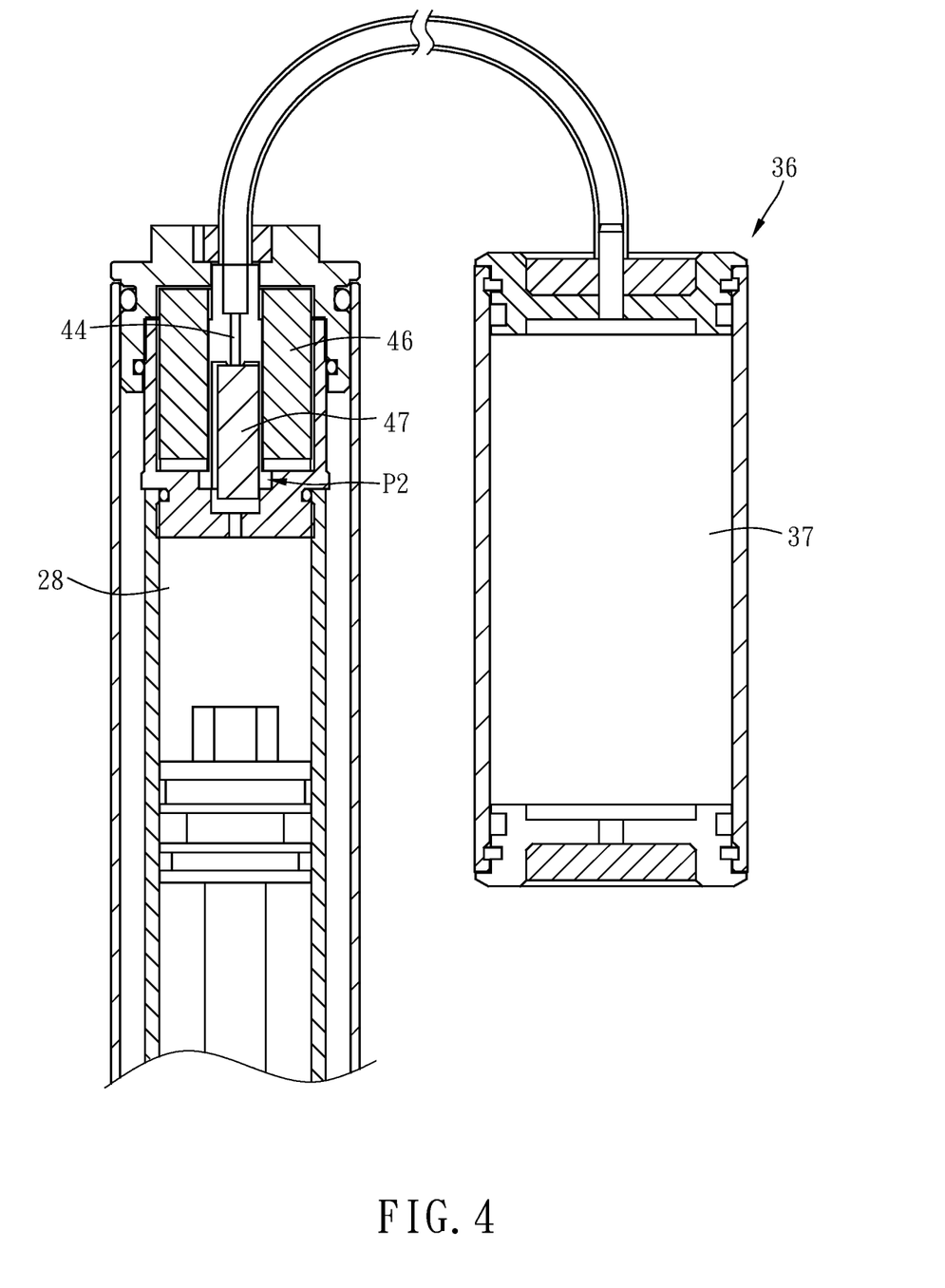
FIG. 4 is similar to FIG. 3, primarily showing that the control valve is in a close state.

It can be known from the above description that when the brake system 14 is not actuated, the control valve 40 is in an open state P1 as shown in FIG. 3. At this time, air can freely flow between the first and second air chambers 28 and 37, so the spring supporting force is relatively smaller. However, when the brake system 14 is actuated to brake, the control valve 40 is switched to a close state P2 as shown in FIG. 4 to make the first and second air chambers 28 and 37 not communicate with each other. At this time, air can't flow between the first and second air chambers 28 and 37, so the space for the air in the first air chamber 28 to be compressed is decreased and the pressure curve of such compression becomes steep, so that the generated pressure is larger than that in the open state of the control valve 40 and therefore the spring supporting force is relatively harder. As to the operation of the front fork 20, it belongs to the prior art, thereby not described hereinafter for saving space.

Figure 5:
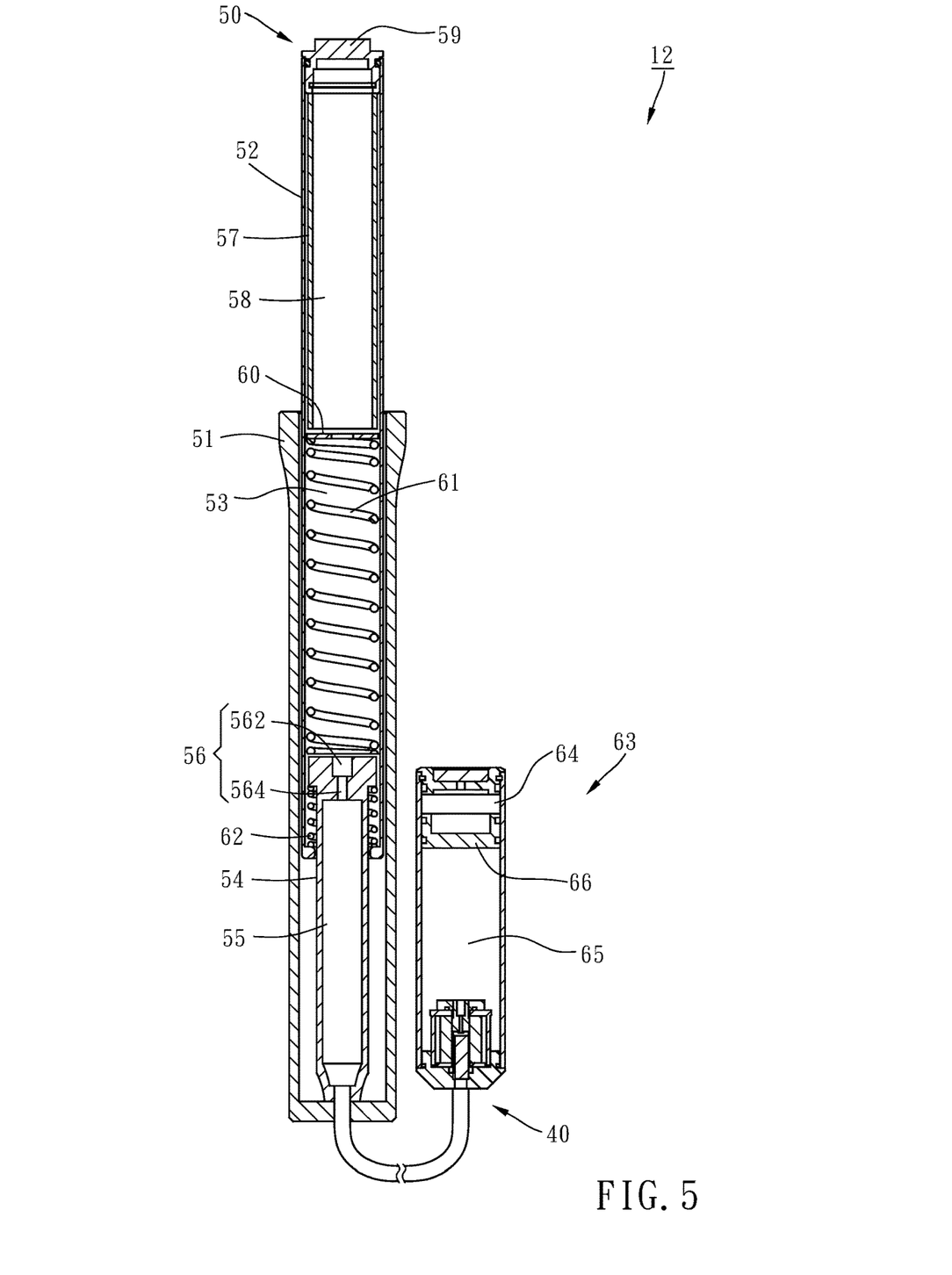
FIG. 5 is a sectional view of a shock-absorbing front fork assembly of a second embodiment of the present invention.

Referring to FIG. 5, a shock-absorbing front fork assembly 12 of a second embodiment of the present invention has an oil-air hybrid type structure, which is primarily different from the above-described embodiment in the position where the control valve 40 is installed.

Specifically speaking, the front fork 50 in this embodiment has an outer tube 51, an inner tube 52, an oil storage cylinder 54, an air storage cylinder 57, a second spring 61, and a second damping spring 62.

The inner tube 52 is inserted into the outer tube 51 through the top end of the outer tube 51 and vertically displaceable relative to the outer tube 51. The inner tube 52 is provided therein with a first oil chamber 53 for the storage of damping oil.

The top end of the oil storage cylinder 54 is inserted into the inner tube 52 through the bottom end of the inner tube 52 in a way that the inner tube 52 will not interfere with the oil storage cylinder 54 during vertically displacing relative to the outer tube 51. The bottom end of the oil storage cylinder 54 is fixed to the bottom end of the outer tube 51. Besides, the oil storage cylinder 54 is provided therein with a second oil chamber 55 for the storage of damping oil, and the top end of the oil storage cylinder 54 has a throttling hole 56. The throttling hole 56 has a large hole portion 562 communicating with the first oil chamber 53 and a small hole portion 564 communicating with the second oil chamber 55, the primary function of which is restricting the velocity and quantity of the damping oil flowing between the first and second oil chambers 53 and 55.

The air storage cylinder 57 is disposed in the inner tube 52 and provided with a first air chamber 58 for the storage of high-pressure air. The top end of the air storage cylinder 57 is connected with the top end of the inner tube 52 by a top cap 59, so that the air storage cylinder 57 and the inner tube 52 can move simultaneously. A pressing plate 60 is disposed below the air storage cylinder 57.

The second spring 61 is disposed in the first oil chamber 53 and abutted between the pressing plate 60 and the top end of the oil storage cylinder 54, for providing buffering effect to the inner tube 52 pressing downwardly.

The second damping spring 62 is disposed in the first oil chamber 53 and abutted between the bottom end of the inner tube 52 and the top end of the oil storage cylinder 54, for providing buffering effect to the inner tube 52 returning upwardly.

The pressure buffering cylinder 63 in this embodiment has a second air chamber 64 and a third oil chamber 65. The second air chamber 64 and the third oil chamber 65 are separated by a piston 66, thereby not communicating with each other.

Figure 6:
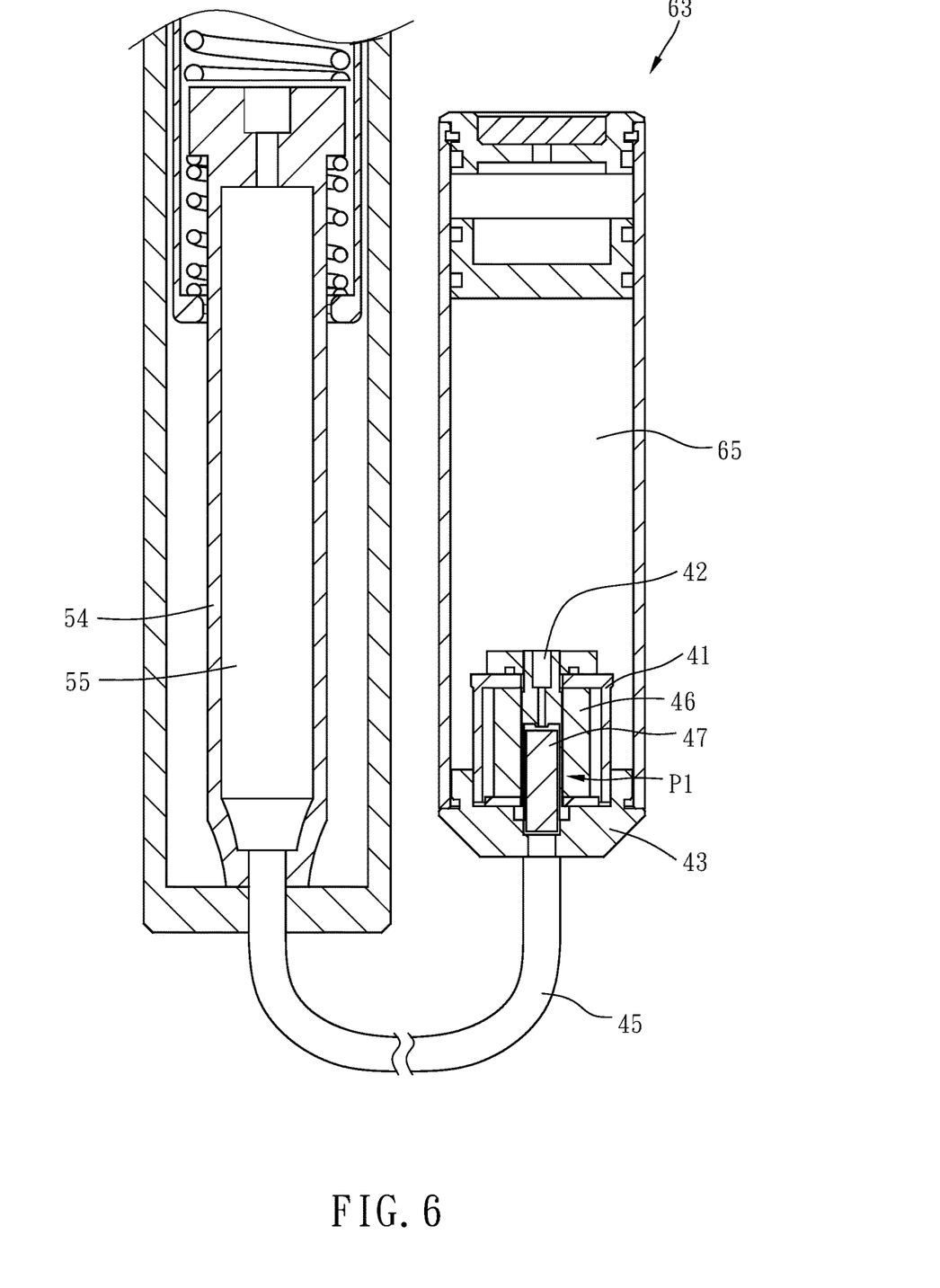
FIG. 6 is an enlarged view of a part of FIG. 5, primarily showing that a control valve is in an open state.

The control valve 40 in this embodiment is attached to the pressure buffering cylinder 63. Specifically speaking, as shown in FIG. 6, the valve seat 41 is disposed in the third oil chamber 65, and the first valve hole 42 of the valve seat 41 communicates with the third oil chamber 65. The valve cap 43 is installed at the bottom end of the pressure buffering cylinder 36 to close the third oil chamber 65, and combined with the valve seat 41 to allow the coil 46 to be accommodated therebetween. Besides, the valve cap 43 is connected with the oil storage cylinder 54 through a pipe 45 in a way that the second valve hole 44 of the valve cap 43 communicates with the second oil chamber 55 of the oil storage cylinder 54. The coil 46 is disposed between the valve seat 41 and the valve cap 43 and electrically connected with the brake system 14 in a way that the coil 46 can be disconnected from power or connected to power according to the operation of the brake system 14. The valve core 47 is disposed between the first and second valve holes 42 and 44 and surrounded by the coil 46. When the brake system 14 is not actuated to brake, the coil 46 is disconnected from power, and the valve core 47 is freely movable between the first and second valve holes 42 and 44, so that the second and third oil chambers 55 and 65 communicate with each other. When the brake system 14 is actuated to brake, the coil 46 is connected to power, and the valve core 47 is attracted by the coil 46 to block up the first valve hole 42, so that the second and third oil chambers 55 and 65 are blocked from communicating with each other.

Figure 7:
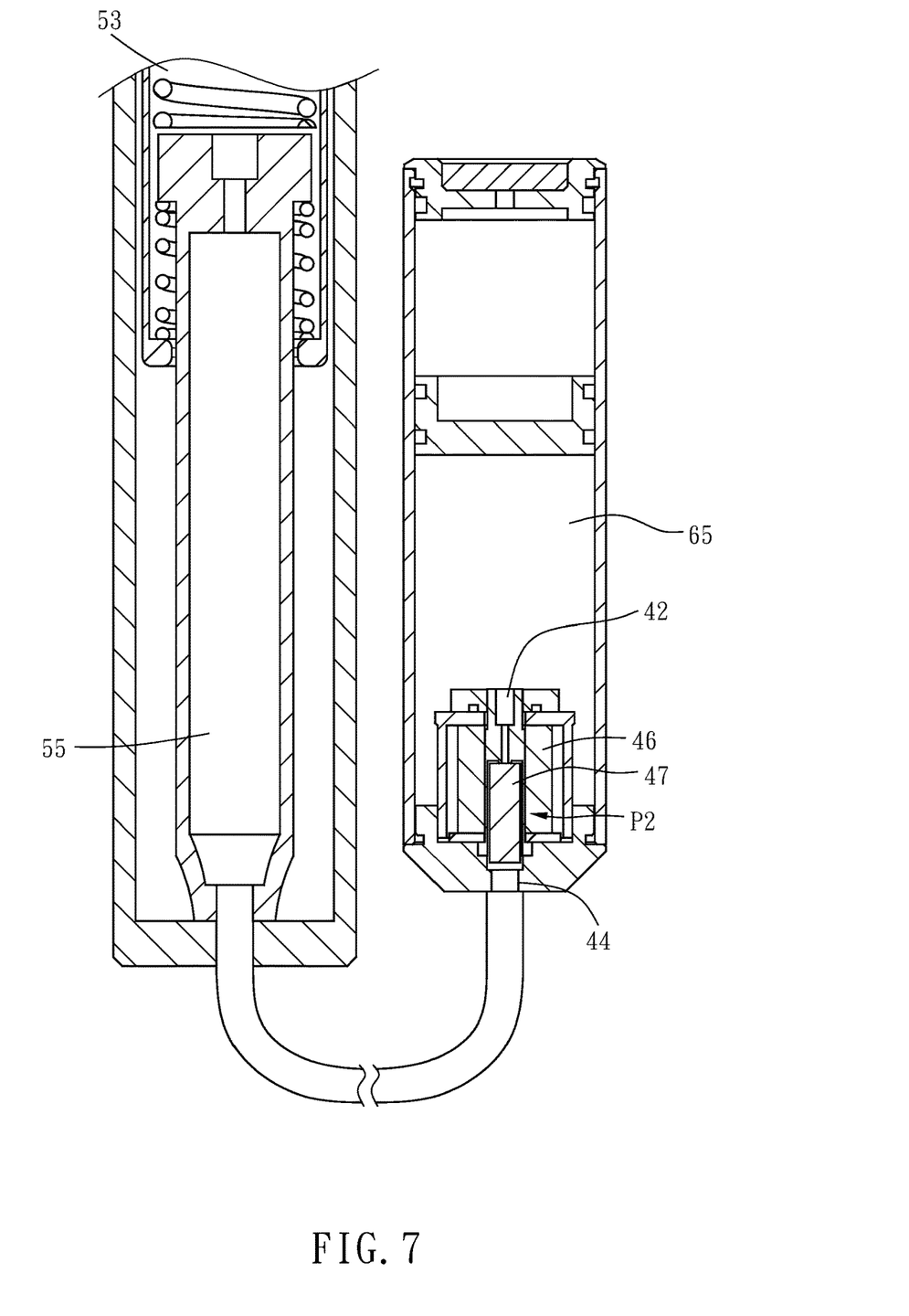
FIG. 7 is similar to FIG. 6, primarily showing that the control valve is in a close state.

It can be known from the above description that when the brake system 14 is not actuated, the control valve 40 is in the open state P1 as shown in FIG. 6. At this time, the damping oil can freely flow between the second and third oil chambers 55 and 65, so the spring supporting force is relatively smaller. When the brake system 14 is actuated to brake, the control valve 40 is switched to the close state P2 as shown in FIG. 7 to make the second and third oil chambers 55 and 65 not communicate with each other. At this time, the damping oil can't flow between the second and third oil chambers 55 and 65, so the pressure resulted from the compression of the damping oil in the first and second oil chambers 53 and 55 is relatively larger and thereby the spring supporting force is relatively larger. As to the operation of the front fork 50, it belongs to the prior art, thereby not described hereinafter for saving space.

In conclusion, in the present invention the spring supporting force of the shock-absorbing front fork assembly 10 and 12 is adjusted by the operation of the brake. The supporting force is relatively smaller in the normal running condition and relatively larger in the braking condition, so that the riding comfort is increased and the running safety is raised.

What is claimed is:

1. A shock-absorbing front fork assembly of a motorcycle, the motorcycle comprising a brake system, the shock-absorbing front fork assembly comprising:
    a front fork;
    a pressure buffering cylinder; and
    a control valve disposed between the front fork and the pressure buffering cylinder and electrically connected with the brake system in a way that the control valve is switched between an open state and a close state according to operation of the brake system, the control valve being in the open state to make the front fork and the pressure buffering cylinder communicate with each other when the brake system is not actuated to brake, the control valve being in the close state to make the front fork and the pressure buffering cylinder not communicate with each other when the brake system is actuated to brake,
    wherein the control valve is attached to the front fork, and
    wherein the front fork comprises an outer tube, an inner tube, an oil storage cylinder, an air storage cylinder, a piston rod, a pressing plate, a first spring, and a first damping spring; the inner tube is provided with a first oil chamber and inserted in the outer tube in a way that the inner tube is vertically displaceable relative to the outer tube; a top end of the oil storage cylinder is inserted in the inner tube; a bottom end of the oil storage cylinder is fixed to a bottom end of the outer tube; the oil storage cylinder has a second oil chamber communicating with the first oil chamber; the air storage cylinder is disposed in the inner tube and provided with a first air chamber;
    the piston rod is disposed in the air storage cylinder in a way that the piston rod is vertically displaceable relative to the air storage cylinder and a bottom end of the piston rod is located out of a bottom end of the air storage cylinder; the pressing plate is disposed below the air storage cylinder and connected with the bottom end of the piston rod; the first spring is disposed in the first oil chamber and abutted between the pressing plate and the top end of the oil storage cylinder;
    the first damping spring is disposed in the first oil chamber and abutted between a bottom end of the inner tube and the top end of the oil storage cylinder; the pressure buffering cylinder has a second air chamber; the control valve is attached to a top end of the inner tube and a top end of the air storage cylinder and connected with the pressure buffering cylinder through a pipe; when the control valve is in the open state, the first and second air chambers communicate with each other;
    when the control valve is in the close state, the first and second air chambers are blocked from communicating with each other.

2. The shock-absorbing front fork assembly as claimed in claim 1, wherein the control valve comprises a valve seat, a valve cap, a coil and a valve core; the valve seat is attached to the top end of the air storage cylinder and provided with a first valve hole communicating with the first air chamber; the valve cap connects a top end of the valve seat and the top end of the inner tube and has a second valve hole; the second valve hole communicates with the second air chamber through the pipe; the coil is disposed in the valve seat; the valve core is disposed between the first and second valve holes in a way that the valve core is vertically displaceable and surrounded by the coil; when the control valve is in the open state, the second valve hole is not blocked up by the valve core so that the first and second air chambers communicate with each other; when the control valve is in the close state, the valve core is attracted by the coil to block up the second valve hole so that the first and second air chambers are blocked from communicating with each other.

3. The shock-absorbing front fork assembly as claimed in claim 1, wherein the top end of the oil storage cylinder has a throttling hole; the throttling hole has a large hole portion and a small hole portion; the large hole portion communicates with the first oil chamber;
    the small hole portion communicates with the second oil chamber.

4. A shock-absorbing front fork assembly of a motorcycle, the motorcycle comprising a brake system, the shock-absorbing front fork assembly comprising:
    a front fork;
    a pressure buffering cylinder; and
    a control valve disposed between the front fork and the pressure buffering cylinder and electrically connected with the brake system in a way that the control valve is switched between an open state and a close state according to operation of the brake system, the control valve being in the open state to make the front fork and the pressure buffering cylinder communicate with each other when the brake system is not actuated to brake, the control valve being in the close state to make the front fork and the pressure buffering cylinder not communicate with each other when the brake system is actuated to brake,
    wherein the control valve is attached to the pressure buffering cylinder, and
    wherein the front fork comprises an outer tube, an inner tube, an oil storage cylinder, an air storage cylinder, a top cap, a pressing plate, a second spring, and a second damping spring; the inner tube is provided with a first oil chamber and inserted in the outer tube in a way that the inner tube is vertically displaceable relative to the outer tube; a top end of the oil storage cylinder is inserted in the inner tube; a bottom end of the oil storage cylinder is fixed to a bottom end of the outer tube; the oil storage cylinder has a second oil chamber communicating with the first oil chamber; the air storage cylinder is disposed in the inner tube and provided with a first air chamber communicating with the first oil chamber; the top cap connects a top end of the inner tube and a top end of the air storage cylinder;

the pressing plate is disposed below the air storage cylinder; the second spring is disposed in the first oil chamber and abutted between the pressing plate and the top end of the oil storage cylinder; the second damping spring is disposed in the first oil chamber and abutted between a bottom end of the inner tube and the top end of the oil storage cylinder; the pressure buffering cylinder has a second air chamber and a third oil chamber; the second air chamber and the third oil chamber are blocked from communicating with each other; the control valve is attached to the pressure buffering cylinder and connected with the oil storage cylinder through a pipe; when the control valve is in the open state, the second and third oil chambers communicate with each other; when the control valve is in the close state, the second and third oil chambers are blocked from communicating with each other.

5. The shock-absorbing front fork assembly as claimed in claim 4, wherein the control valve comprises a valve seat, a valve cap, a coil and a valve core; the valve seat is disposed in the third oil chamber and provided with a first valve hole communicating with the third oil chamber; the valve cap is attached to the valve seat, connected with a bottom end of the pressure buffering cylinder and provided with a second valve hole; the second valve hole communicates with the second oil chamber through the pipe; the coil is disposed in the valve seat; the valve core is disposed between the first and second valve holes in a way that the valve core is vertically displaceable and surrounded by the coil; when the control valve is in the open state, the first valve hole is not blocked up by the valve core so that the second and third oil chambers communicate with each other; when the control valve is in the close state, the valve core is attracted by the coil to block up the first valve hole so that the second and third oil chambers are blocked from communicating with each other.

6. The shock-absorbing front fork assembly as claimed in claim 4, wherein the top end of the oil storage cylinder has a throttling hole; the throttling hole has a large hole portion and a small hole portion; the large hole portion communicates with the first oil chamber; the small hole portion communicates with the second oil chamber.

\* \* \* \* \*